Sept. 4, 1928.
W. B. GLOVER ET AL
1,683,541
SPRING BUFFER FOR MOTOR VEHICLES
Filed Sept. 9, 1927
Fig:1.
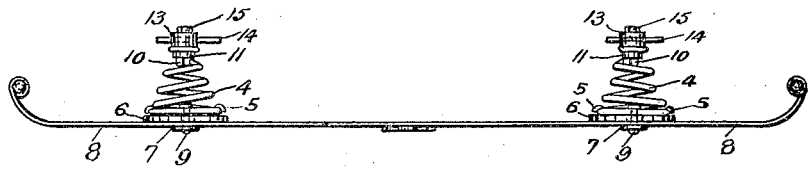
Fig:2.
Fig:3.
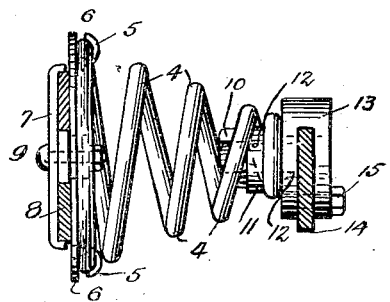
Inventors
William Ballington Glover
William Henry Richardson
By
Attorney.

Patented Sept. 4, 1928.

1,683,541

UNITED STATES PATENT OFFICE.

WILLIAM BALLINGTON GLOVER AND WILLIAM HENNRY RICHARDSON, OF SUBIACO, NEAR PERTH, WESTERN AUSTRALIA, AUSTRALIA.

SPRING BUFFER FOR MOTOR VEHICLES.

Application filed September 9, 1927, Serial No. 218,520, and in Australia May 11, 1927.

The object of this invention is to provide the front and rear buffers, bumpers or fenders of motor vehicles with springs which are interposed between said buffers or the like and the vehicle, in order to act as rebound and shock absorbing agents and afford a resilient action to said buffers or the like.

The construction and use of the invention will be explained with the aid of the accompanying drawings, wherein Fig. 1 is a front view. Fig. 2 is a plan, and Fig. 3 is an enlarged side sectional view on line 3—3 of Fig. 1, and showing the buffer with the interposed spiral spring connected to a bracket of the chassis of the vehicle.

In this latter view the curved end of the buffer is removed for sake of clearness.

Referring to said drawings, 4 is a spiral spring, preferably of conical shape in a longitudinal direction.

The larger end of the spring 4 is mounted between a clamping strap 5, which has recesses adjacent its opposite ends to receive said end, and a disc plate 6 of larger diameter than the space between the buffer plates 8 and which bears against the inner faces of the latter. A clamping strap 7 of greater length than the space between the buffer plates 8 bears against the outer faces of the buffer plates.

Bolts 9, connected to or extending through the clamping plate 7, and extending through the space between the buffer plates and through the disc plate 6 and clamping strap 5, together with nuts on the ends of said bolts, serve to hold the clamping strap 5, spring 4, disc plate 6, buffer plates 8 and clamping strap 7 in assembled relation. In the preferred embodiment of the invention the clamping straps 7 are longer than the combined width of the buffer plates 8 and the space between said plates and have their ends turned over the edges of the buffer plates.

The opposite or inner and smaller end of the spring 4 is secured by nut 10 and washer 11 on the stem 12 integrally formed on the bracket 13.

This bracket is made with a slot which enables the bracket to be neatly positioned on a suitable anchor bracket 14 of the chassis and be secured by screw stud pin 15.

It will be noted that the springs 4 act as shock absorbers for the vehicle in the event of the buffer plates 8 or discs 6 coming into contact with an object.

What we claim as our invention, and desire to secure by Letters Patent, is:—

In a buffer for motor vehicles, a guard comprising two spaced plates connected together at their ends, two conical spiral springs forming a resilient support for said guard, and means for attaching each spring at its larger end to the plates, said means including an outer clamping strap extending across the space between said plates and engaging the outer face of both plates, a bolt connected to the strap and extending between the plates, a disk plate mounted upon the bolt and bearing against the inner faces of both of the plates and against which the spring abuts, a second clamping plate also mounted on said bolt and having recessed terminals to engage the terminal of the spring and be clamped thereagainst to hold the spring upon the disk, and a nut upon the bolt and bearing against the rear side of said second clamping plate for locking the parts in clamped relation.

In testimony whereof we have hereunto set our hands.

WILLIAM BALLINGTON GLOVER.
WILLIAM HENNRY RICHARDSON.